Dec. 25, 1928.                                          1,696,664
R. R. BLOSS
BULL WHEEL STRUCTURE
Filed May 29, 1926
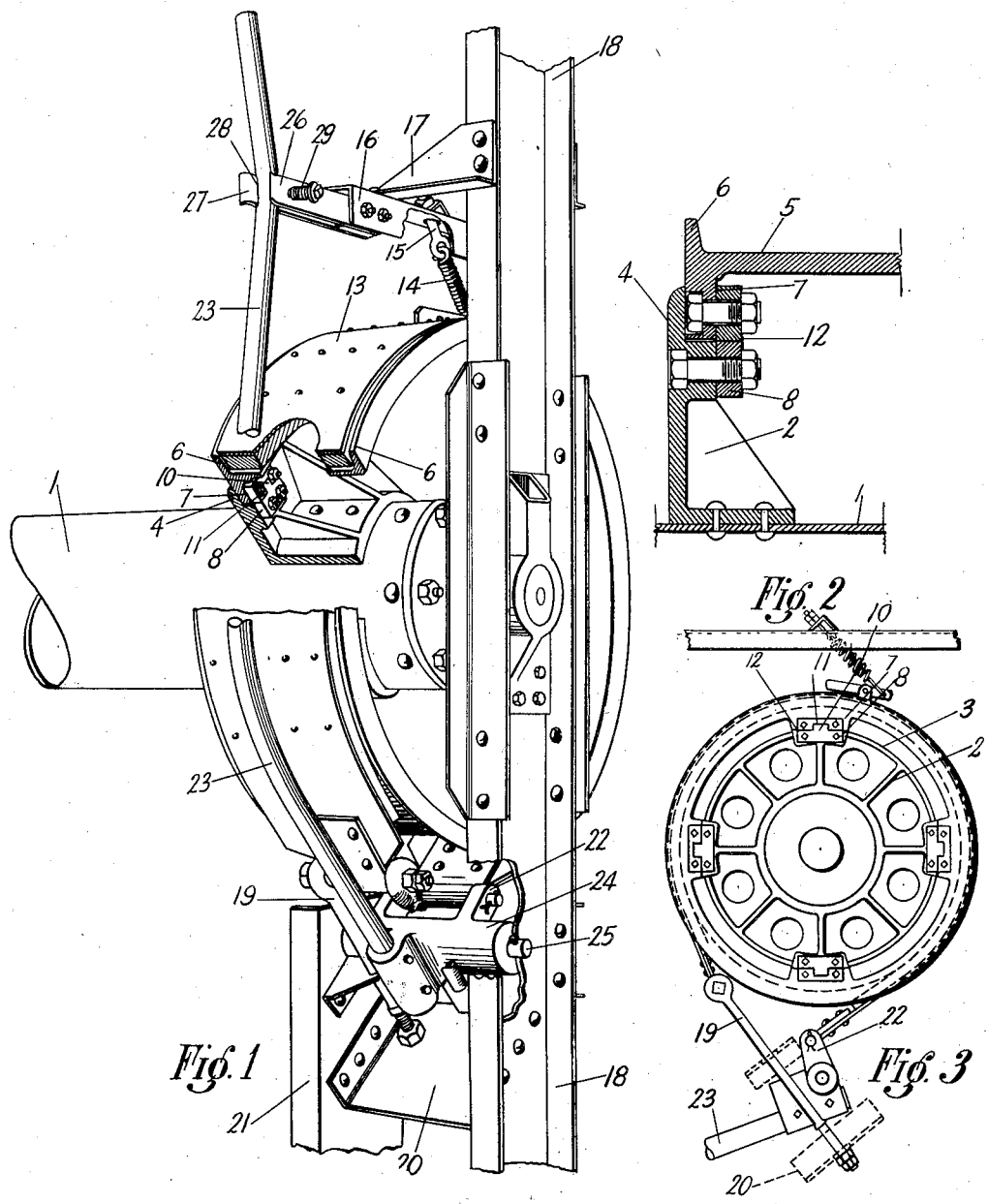
Richard R. Bloss
INVENTOR.
BY
ATTORNEYS.

Patented Dec. 25, 1928.

1,696,664

UNITED STATES PATENT OFFICE.

RICHARD R. BLOSS, OF COLUMBUS, OHIO, ASSIGNOR TO THE INTERNATIONAL DERRICK & EQUIPMENT COMPANY, OF COLUMBUS, OHIO, A CORPORATION OF OHIO.

BULL-WHEEL STRUCTURE.

Application filed May 29, 1926. Serial No. 112,655.

My invention relates to bull wheel structure and has to do primarily with the brake end of a bull wheel. It aims to provide a self-contained brake structure for a bull wheel that obviates many of the disadvantages present in bull wheels now being marketed.

It is a more or less common practice in the art today to utilize a comparatively large brake wheel and to use a brake band whose ends and whose leverage mechanism are secured to the floor of the structure in which the bull wheel is mounted. This produces certain irregularities of operation, sometimes due to the varying levels of the floor structure and sometimes due to other causes. Likewise, the comparatively large brake wheel which is ordinarily used is cumbersome and relatively inefficient. Also, those brake wheels which are provided with a periphery of wood suffer much deterioration because of severe climatic conditions and because of continuous or heavy drilling and production operations.

In my present invention, I have overcome most of the difficulties found in these prior art devices. I have provided a brake wheel structure and a leverage mechanism therefor which is self-contained in the sense that it is mounted practically as a unit upon standards. One result is that the drawbacks of floor irregularities are immaterial. Furthermore, I have devised a relatively small brake wheel structure which is of such a construction that a greater braking efficiency can be obtained than with the present known brake wheels of much larger size.

One feature of my invention consists in the fact that the harmful effects of excessive heat which ordinarily arises from severe braking action are guarded against by the provision of a hard metal peripheral unit that is capable of all necessary free expansion independently of the hub structure upon which it is mounted. In other words, I have provided an annular peripheral unit which is firmly held upon the hub structure under all conditions of operation but which is, at the same time, capable of expanding or contracting freely under temperature changes.

There are numerous other advantageous features of my invention which will appear during the course of this description of the appended drawings wherein similar characters of reference designate corresponding parts and wherein Figure 1 is a perspective view of the brake wheel end of my bull wheel structure, showing the brake wheel, the brake band and the leverage mechanism all mounted upon the upright post structure.

Figure 2 is a detail in section showing the relation of my expansible rim to the drum structure upon which it is mounted.

Figure 3 is a side elevation of my brake wheel with the band mounted thereon and showing the leverage mechanism for operating this band.

In the drawings, my bull wheel shaft is shown at 1 and it will appear that its brake wheel end is provided with a hub member 2 riveted thereon.

This hub structure 2 is of comparatively heavy material and is provided with a periphery 3 upon which my expansible rim structure is supported. Extending radially outward from one end of this periphery is an annular flange 4 against which my expansible rim is intended to be clamped.

This expansible rim is also of annular form and it comprises a peripheral friction surface 5 located in between radial annular flanges 6. These radial annular flanges 6 are designed to restrain the brake band against lateral movement upon the friction surface 5.

The means for fastening my expansible rim upon the hub structure comprises a series of interfitting lug members. As shown in Figure 1, the expansible rim carries an inwardly extending radial flange 7 which rides upon the periphery 3 of the hub structure. This series of interfitting lug members is comprised of a plurality of lugs 8 which are bolted to the hub structure adjacent the periphery thereof and which have angular extensions 10 that extend beyond this periphery 3 of the hub structure and bear firmly against the inner radial flange 7 of the rim. They thereby clamp the rim against the flange 4 of the hub structure and prevent lateral movement of this rim on the hub structure.

These extensions 10 fit into sockets 11 upon lug members 12 which are bolted to the inwardly extending radial flange of my expansible rim. These lugs 12, as is apparent, are bifurcated members with their legs embracing the extensions 10 on the lugs 8. These legs thus prevent relative rotation of the rim and the hub member. The result of this structure is that the rim is restrained from moving either laterally or from rotating about the hub structure. At the same time, the rim is free to expand or contract upon the hub structure and experience has demonstrated that such expansion and contraction takes place to a material extent in the normal operation of my braking device.

The brake band of my device is designated 13 and it embraces the rim of the brake wheel, being normally held away from contact with the friction surface 5 by means of a spring 14 connected at one end to the brake band and at its other end to a swivel bolt 15 carried by a cross-bar 16 which is in turn supported by laterally extending members 17 riveted to the upstanding part 18. This brake band is open at its bottom and its free ends are connected to the leverage mechanism, as shown best in Figures 1 and 3.

One end of the brake band is connected to a pair of bolts 19 which extend through and are secured to an inclined plate 20 which is carried in between the upstanding post 18 and the parallel upstanding post 21. The other end of the brake band is pivotally connected to the work arm 22 of the lever 23 which comprises a fulcrum member 24 having journals 25 respectively entering and being supported by the upstanding posts 18 and 21.

The lever arm is preferably of considerable length and is bowed so that it generally approximates the curvature of the brake wheel for a portion of its length and does not interfere therewith when moved into its uppermost position, this being its position of rest when the braking mechanism is not being utilized. At its upper end, this lever is designed to be forced into a bifurcated spring latch member comprising a leg 26, a complemental leg 27 having an annular projection 28 formed thereon and a spring member 29 of sufficient strength to hold the lever against accidental displacement and to permit ready removal of the lever therefrom by manipulation of the latch manually. It will be understood that the brake band is held away from contact with the friction surface 5 when this lever is in uppermost position by the spring 14 and that the lever handle may be subjected to the weight of the operator when moved down to effect application of the brake.

Another feature of my invention consists in the fact that both ends of the brake band are identical in structure so that the band may be turned end to end to compensate for any inequalities of wear which usually occur because of the fact that the brake wheel rotates in one direction practically all of the time when the brake is applied.

It will be apparent that my brake wheel structure, being mounted as a unit upon upstanding posts which, likewise, support the brake end of the bull wheel, produces a structure which is not subject to the inequalities of the floor upon which these structures are usually mounted. It will also be evident that the lever is held out of the way of the operator when not required and, yet, at the same time it is in such a position that it may be grabbed and pulled into operative position with a minimum of difficulty. Likewise, the action of the spring 14 prevents the accidental wearing of the braking surface when not in use.

Furthermore, the feature of mounting the bull hoist gudgeon in a bearing carried by a post with a fixed relation between the post and the brake drum, so that the brake band, brake lever, and mounting for the same can be attached to the post is important. It will permit of maintaining concentric relation between the brake drum and the brake band, irrespective of the variation in the derrick floor and the distances between the center of the bull wheel shaft and the bull wheel girt above or the derrick floor below.

Having thus described my invention, what I claim is:

1. A brake wheel structure comprising a brake wheel, a brake band, a means for holding said brake band away from said brake wheel, said means being located above said brake wheel, a leverage mechanism located beneath said brake wheel, and means for latching said leverage mechanism in inoperative position.

2. A brake wheel structure comprising a drum, a band, and a lever in alignment with said band and curved to partially embrace the band and drum when moved to one of its positions.

3. Brake wheel structure comprising a hub member, an expansible rim mounted upon said hub member, means for preventing the lateral movement of said rim upon said hub member and preventing relative rotation of said hub member and said rim, a brake band, means for holding said brake band away from said rim, said means being disposed above said rim, a leverage mechanism disposed beneath said rim for moving said band into contact with said rim, and means for latching said leverage mechanism in inoperative position.

4. A brake wheel structure for bull wheels comprising a hub member, an annular rim member mounted upon said hub member, and means for holding said rim member upon said hub member, said means being of such a construction that said rim member is expansible freely and without restraint from said hub member.

5. A brake wheel structure for bull wheels comprising a hub member, an annular rim member mounted upon said hub member, means for holding said rim member upon said hub member, said means being of such a construction that said rim member is expansible freely and without restraint from said hub member and is prevented from lateral movement upon said hub member, a brake band, and leverage mechanism for actuating said brake band.

6. A brake wheel structure for bull wheels comprising a hub member, an annular rim member mounted upon said hub member, means for holding said rim member upon said hub member, said means being of such a construction that said rim member is expansible freely and without restraint from said hub member and is prevented from lateral movement upon said hub member, means for preventing relative rotation of said hub member and said rim, a brake band, and leverage mechanism for actuating said brake band.

7. A brake wheel structure for bull wheels comprising a hub member, an annular rim member mounted upon said hub member, and means for holding said rim member upon said hub member and in concentric relation thereto, the said means being of such a construction that said rim member is expansible freely and is still maintained in concentric relation to said hub member.

8. In combination with the end head of a hoisting drum, a separately formed circumferentially continuous annular brake rim carried by said end head and keyed thereto by joints permitting radial and continuous annular expansion of the same independently of the end head, said continuous brake rim having its outer peripheral portion free and unconfined by the end head.

9. In combination with the end head of a hoisting drum, a separately formed circumferentially continuous annular brake rim carried by said end head and keyed thereto by joints permitting radial and continuous annular expansion of the same independently of the end head, said continuous brake rim having its outer peripheral portion free and unconfined by the end head and provided with integral edge flanges to confine a brake band therebetween and adapted to expand with the rim.

In testimony whereof I hereby affix my signature.

RICHARD R. BLOSS.